(12) United States Patent
Thomas et al.

(10) Patent No.: US 6,782,204 B1
(45) Date of Patent: Aug. 24, 2004

(54) NETWORK WITH SHARED OPTICAL SOURCES

(75) Inventors: Mark Thomas, Petaluma, CA (US); Michael Munroe, Petaluma, CA (US)

(73) Assignee: Mahi Networks, Petaluma, CA (US)

( * ) Notice: Subject to any disclaimer, the term of this patent is extended or adjusted under 35 U.S.C. 154(b) by 586 days.

(21) Appl. No.: 09/841,761

(22) Filed: Apr. 24, 2001

Related U.S. Application Data

(60) Provisional application No. 60/199,287, filed on Apr. 24, 2000.

(51) Int. Cl.[7] .................................................. H04J 14/02
(52) U.S. Cl. ............................. 398/85; 398/82; 398/83; 385/24
(58) Field of Search ............................... 398/83–85, 79, 398/82; 385/24

(56) References Cited

U.S. PATENT DOCUMENTS

| | | | | |
|---|---|---|---|---|
| 6,084,694 A | * | 7/2000 | Milton et al. .................. | 398/83 |
| 6,115,158 A | * | 9/2000 | Kaneko ......................... | 398/79 |
| 6,233,077 B1 | * | 5/2001 | Alexander et al. ............ | 398/79 |

* cited by examiner

*Primary Examiner*—Kinfe-Michael Negash
(74) *Attorney, Agent, or Firm*—Blakely Sokoloff Taylor & Zafman LLP

(57) ABSTRACT

Methods and apparatuses are contemplated for sharing optical sources in an optical network, which typically reduces the number of optical sources needed to operate the optical network.

20 Claims, 19 Drawing Sheets

US 6,782,204 B1

NETWORK WITH SHARED OPTICAL SOURCES

This application claims priority from U.S. Provisional Patent Application No. 60/199,287, filed Apr. 24, 2000.

FIELD OF THE INVENTION

The invention relates to the field of optical networks.

BACKGROUND OF THE INVENTION

Optical networks typically utilize a plurality of optical sources, typically lasers, to generate optical carriers which are typically modulated with information at a transmitting station, transmitted on one or more optical waveguides (typically optical fiber), and subsequently demodulated at a receiving station. Two or more optical carriers of differing wavelengths $\lambda_i$ are typically multiplexed onto an optical waveguide, transmitted along the optical waveguide, and de-multiplexed at another location, at which location one or more modulated optical carriers is demodulated and the information delivered to its destination.

FIG. 1 (prior art) is a block diagram of a ring Optical Add/Drop Multiplexed (OADM) network 100, comprising a plurality of add/drop nodes 102. FIG. 2 (prior art) is a block diagram of a linear Optical Add/Drop Multiplexed (OADM) network 200, comprising a plurality of add/drop nodes 202. A typical add/drop node 300 is depicted in FIG. 3 (prior art).

A multiplexed input signal 302 comprising a plurality of modulated respective optical carriers (also referred to as wavelengths herein) each carrier comprising a substantially single respective wavelength $\lambda_i$, i.e., a substantially pure single wavelength beam, passes through an optical amplifier 304, and into a separating device 306, typically a de-multiplexing device, that separates the "through" wavelengths 308 from the "drop" wavelengths 310. The drop wavelengths 310 are directed to a device 312 where they are de-multiplexed, and each wavelength is output onto an optical waveguide 314, which waveguide is typically optical fiber. Each of the drop wavelengths 310 is demodulated in a respective receiver 316, the respective receiver 316 then passing the information as a result of demodulation, on to its respective destination. The information received at receiver 316 is also, in parallel fashion, channeled to an input 322 (labeled Add signal #1) of a modulator 320, where the information modulates a new beam originating from a source 318 whose wavelength is typically identical to the carrier of the respective drop wavelength (in this case, $\lambda_1$). Each information channel to be modulated typically requires a separate laser source, as typically a laser source emits a single carrier wavelength. Laser sources used in optical networks tend to be costly items; therefore it would be advantageous to reduce the number of sources, e.g., 318, typically lasers, needed to operate the add/drop node 300.

FIG. 9 is a block diagram of a Passive Optical Network (PON), comprising a Host Digital Terminal (HDT) 902, which in turn typically comprises a plurality of Host Digital Terminal Passive Optical Network Terminal Modules (HPTM) 904, and typically a plurality of Optical Network Units (ONU) 906. Typically each of the Optical Network Units (ONU) 906 comprises an optical source, typically a laser, which, in the ONU's transmit mode, generates a carrier wavelength $\lambda_i$ that is modulated in the ONU before being output. As indicated above, optical sources, typically lasers, used in optical networks tend to be costly items; if it were possible to eliminate the necessity for each ONU to comprise an optical source, the result would be advantageous, in that there would be a reduction in the overall number of optical sources required in order to operate the PON.

SUMMARY OF THE INVENTION

Methods and apparatuses are contemplated for sharing optical sources in an optical network, which typically reduces the number of optical sources needed to operate the optical network.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Methods and apparatus are described for sharing optical sources in an optical network. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 4A:
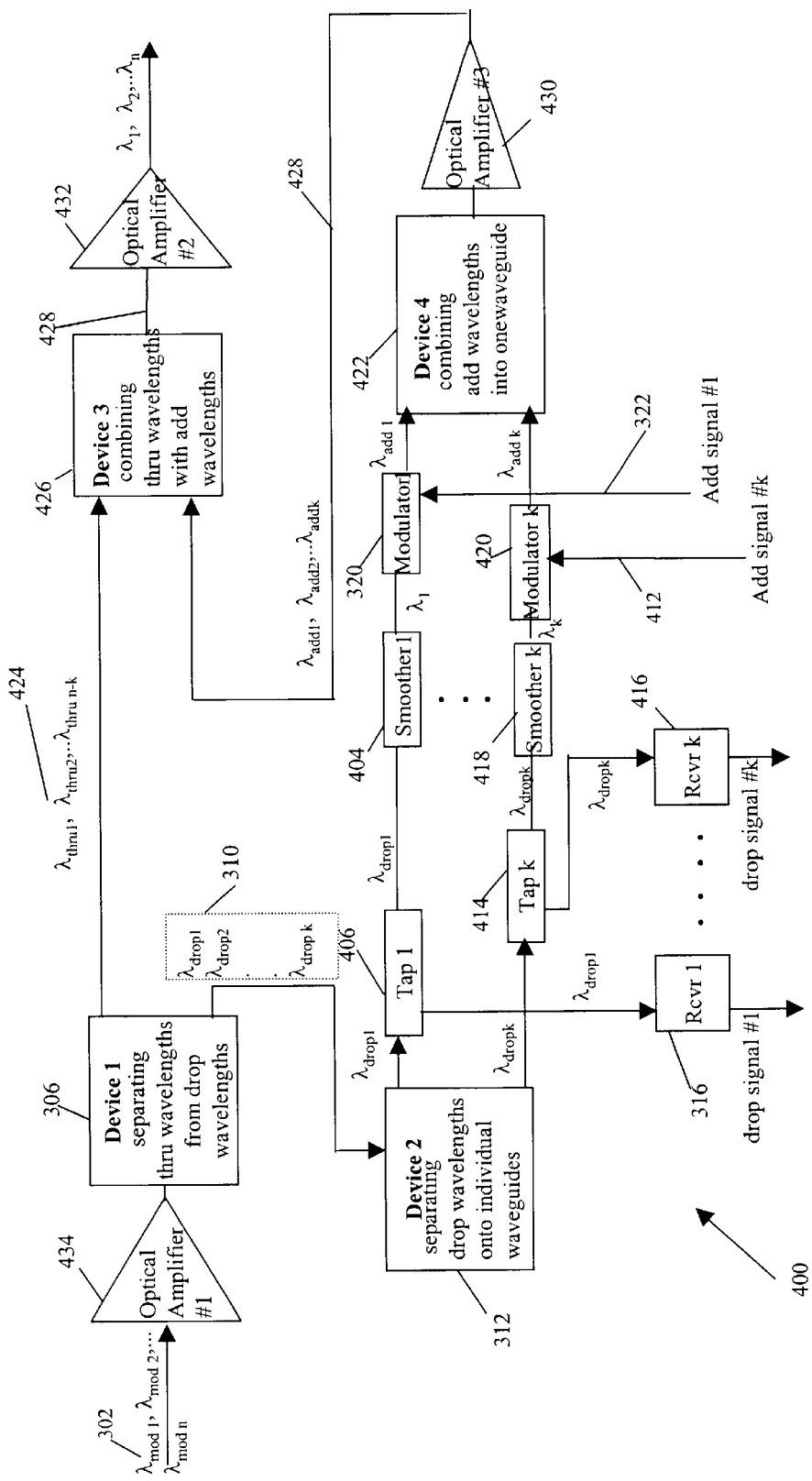
FIG. 4a is a block diagram of an add/drop node with shared optical sources, according to an embodiment of the invention.

FIG. 4a depicts an embodiment of the invention, comprising an optical add/drop device 400 wherein the internal optical sources that are characteristically present in a prior art optical add/drop device, are not used. An input signal 302 comprises a plurality of modulated wavelengths $\lambda_{mod1}$, $\lambda_{mod\ 2}$, ... $\lambda_{mod\ n}$. A device 306 that separates "through" modulated wavelengths from "drop" modulated wavelengths directs the drop modulated wavelengths 310 ($\lambda_{drop1}$, $\lambda_{drop2}$ ..., $\lambda_{drop\ k}$) to a de-multiplexing device 312 that separates the drop modulated wavelengths, and outputs them onto individual waveguides, typically optical fiber. A tap 406 receives a first modulated optical signal $\lambda_{drop1}$ comprising modulated information and a substantially single wavelength optical carrier $\lambda_1$. The tap 406 divides the modulated optical signal $\lambda_{drop1}$ into two portions: a first portion proceeds to a receiver 316, where the modulated information is detected; a second portion is input to a smoother 404, which removes the modulated information from the modulated optical signal $\lambda_{drop1}$, outputting a substantially unmodulated optical carrier $\lambda_1$. The substantially unmodulated optical carrier $\lambda_1$ is then input into a modulator 320, wherein it is re-modulated with information input via an input port 322 (labeled Add signal #1) with, e.g., the information detected in the receiver 316 that was originally on the modulated optical signal $\lambda_{drop1}$. Alternatively, the unmodulated optical carrier $\lambda_1$ may be modulated with other information by the modulator 320 that is input via the input port 322.

In similar fashion, a $k^{th}$ modulated optical signal $\lambda_{drop\ k}$ is divided by a tap 414 into two portions: a first portion proceeds to a receiver 416, where the modulated information is detected; a second portion is input to a smoother 418, which removes the modulated information from the modulated optical signal $\lambda_{drop\ k}$, outputting a substantially unmodulated optical carrier $\lambda_k$. The substantially unmodulated optical carrier $\lambda_k$ is then input into a modulator 420, wherein it is re-modulated with information that input to the modulator 420 through an input port 412 (labeled Add signal #k) with, e.g., the information that was originally on the modulated optical signal $\lambda_{drop1}$ and detected in the receiver 416. Alternatively, the unmodulated optical carrier $\lambda_k$ may be modulated, by the modulator 420, with other information received by the modulator through the input port 412. Likewise, for each of the drop wavelengths, there may be a respective tap for dividing the respective drop wavelength into a respective first portion and a respective second portion; a respective receiver for detecting the respective information on the respective first portion of the respective drop wavelength; a respective smoother for removing modulation from the respective second portion of the respective drop wavelength, outputting a substantially unmodulated carrier; and respective modulator for re-modulating the respective substantially unmodulated optical carrier output from the respective smoother.

Figure 1:
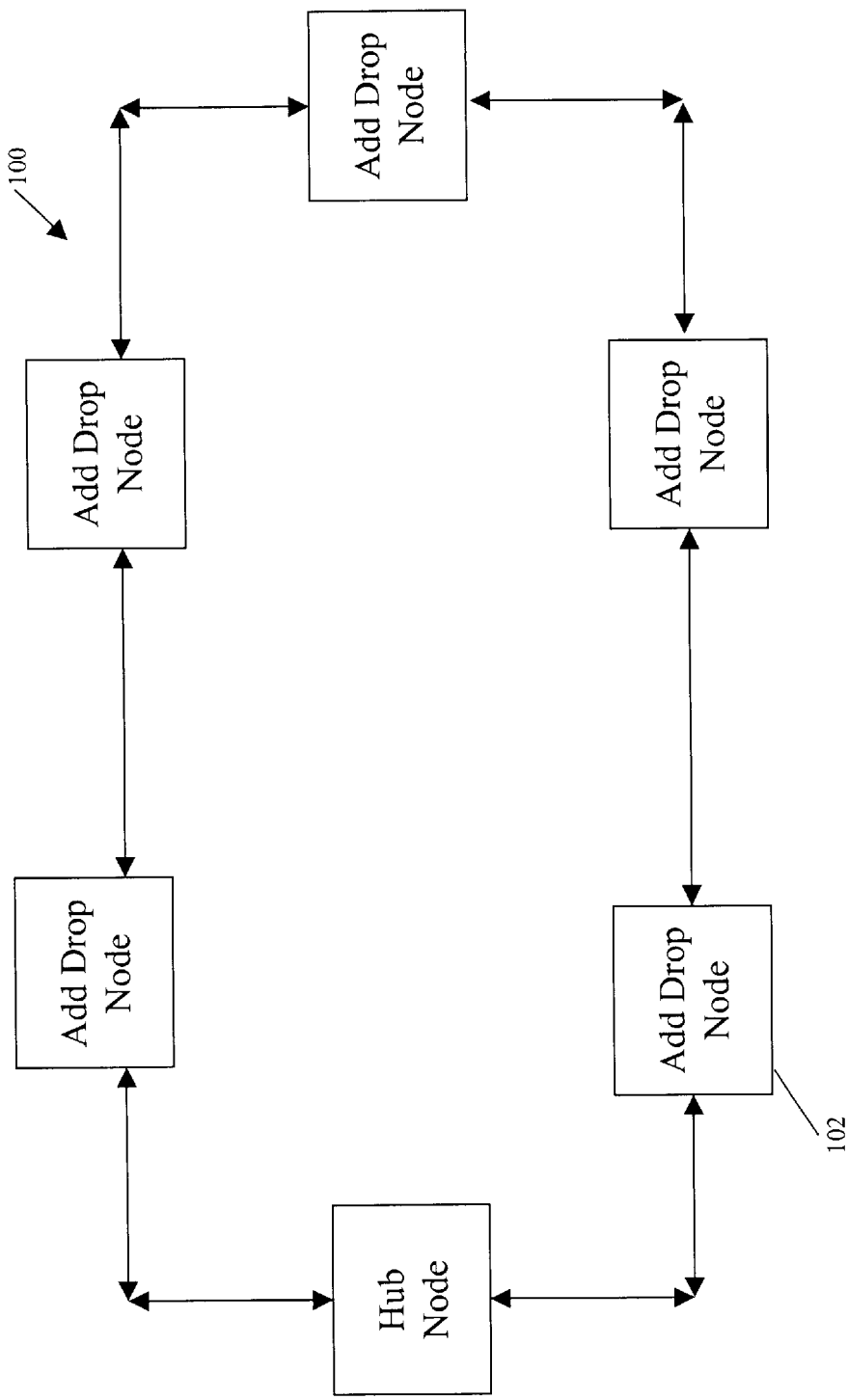
FIG. 1 (prior art) is a block diagram of a ring optical add/drop multiplexing (OADM) network.
Figure 2:
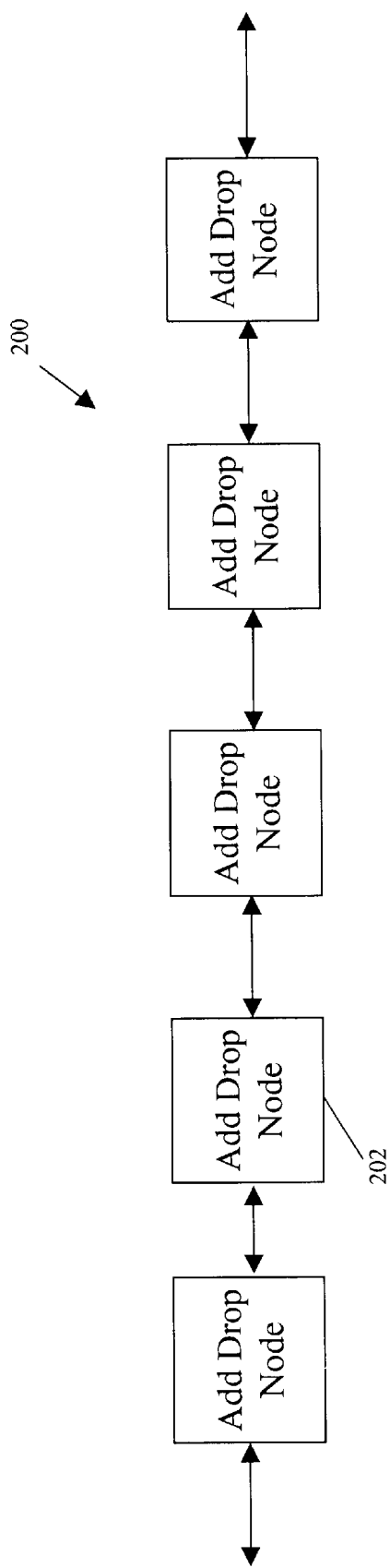
FIG. 2 (prior art) is a block diagram of a linear OADM network.
Figure 3:
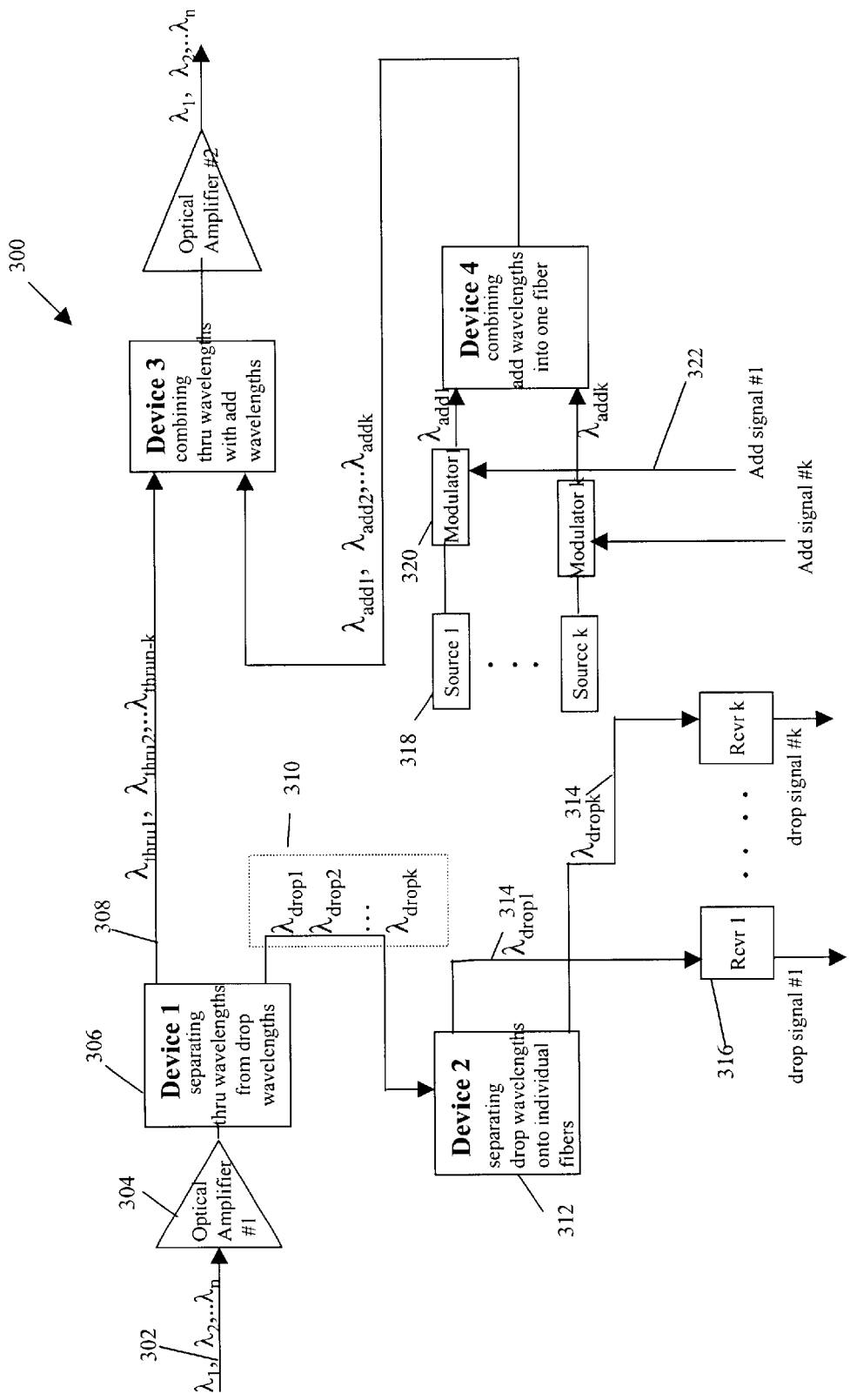
FIG. 3 (prior art) is a block diagram of a typical add/drop node.

Re-modulated optical signals output from the respective modulators 320 ..., 420, are multiplexed by a multiplexing device 422, and subsequently multiplexed with "through" wavelengths 424, by a multiplexing device 426, and then output onto an optical waveguide 428, typically optical fiber. Optical amplifiers 430, 432, 434 are employed as needed to boost signal strength to acceptable levels. In the embodiment shown in FIG. 4a, no additional optical sources are needed to re-modulate the information, received by each of the respective receivers, onto the unmodulated optical carriers $\lambda_1$, ... $\lambda_k$, before multiplexing the re-modulated wavelengths. This is to be contrasted with FIG. 3, wherein a set of sources 302 ... 304, typically comprising lasers, is needed to provide the respective optical carriers for re-modulation by respective modulators 306 ... 308. The embodiment of FIG. 4a exemplifies a Reduced Source Optical Add/Drop Node. Other embodiments of the invention comprising an add/drop node wherein the number of optical sources present is less than the number of drop wavelengths that are demodulated, will likewise be termed a Reduced Source Optical Add/Drop Node.

Figure 16:
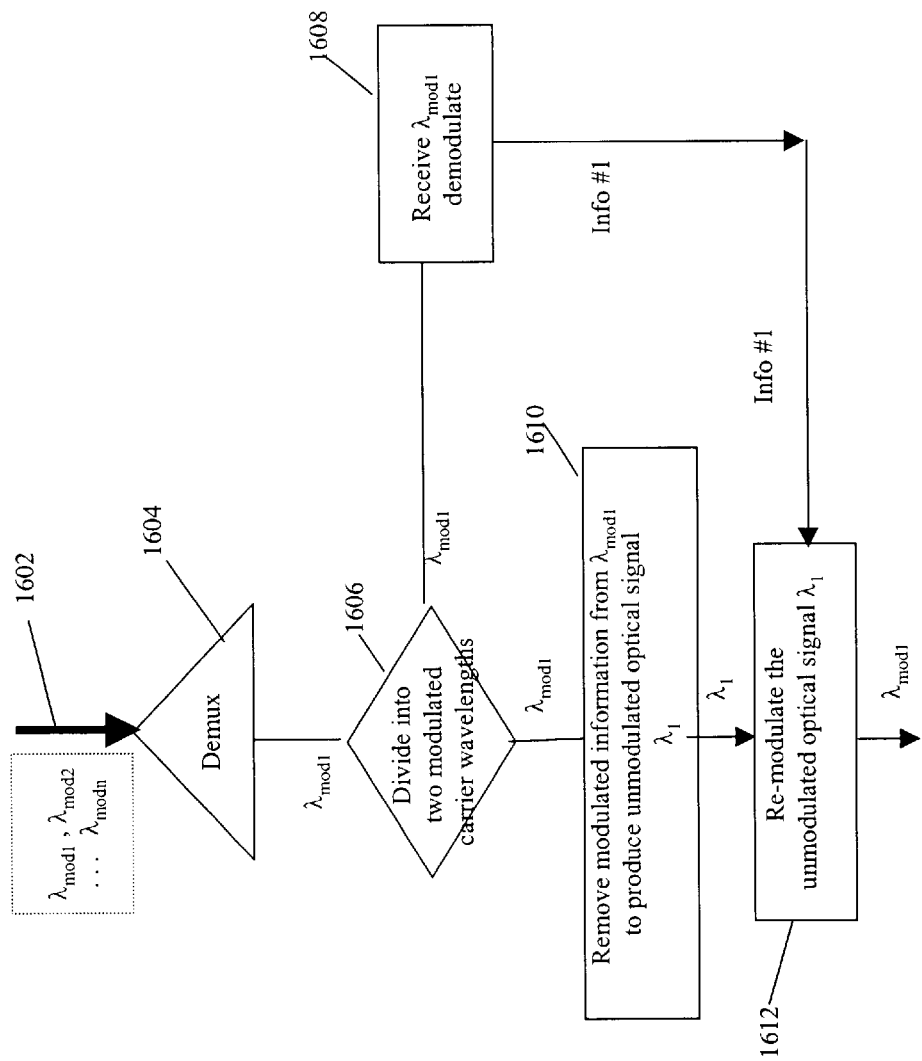
FIG. 16 is a flow chart, beginning with a modulated optical signal, producing an unmodulated optical signal, and re-modulating the unmodulated optical signal.

FIG. 16 shows a flowchart 1600 of a Reduced Source Optical Add/Drop Node. A set of modulated wavelengths 1602 is input to a de-multiplexer 1604, which separates the individual modulated wavelengths and outputs them. A modulated wavelength is divided at step 1606 into two branches ; one branch is received and demodulated at step 1608, while the other branch proceeds to a smoother where the modulated information is removed in step 1610. The unmodulated optical signal $\lambda_1$ is then re-modulated in step 1612, typically with the information decoded at the receiver.

Figure 4B:
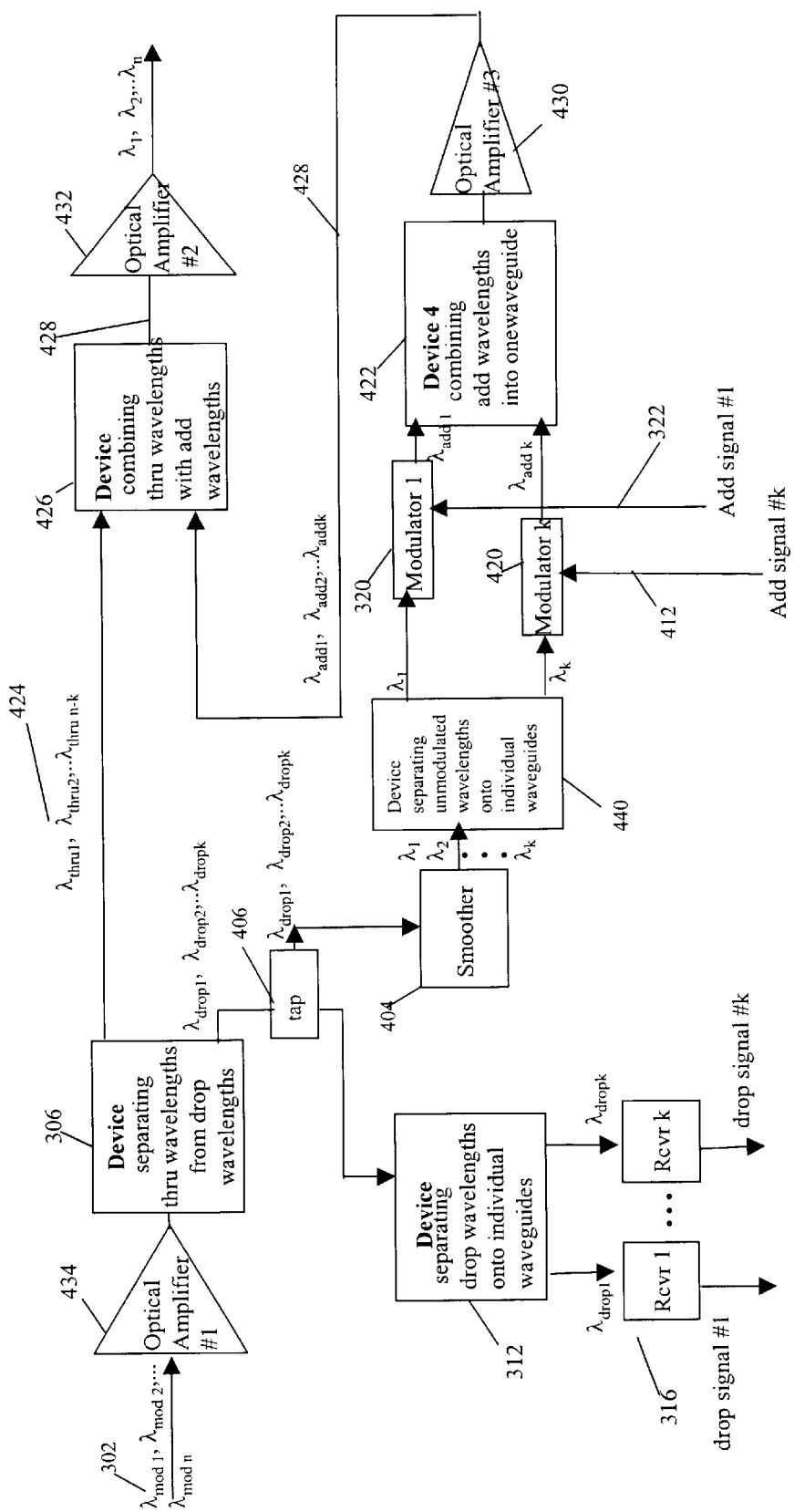
FIG. 4b is a block diagram of an add/drop node with shared optical sources, according to an embodiment of the invention.
Figure 5:
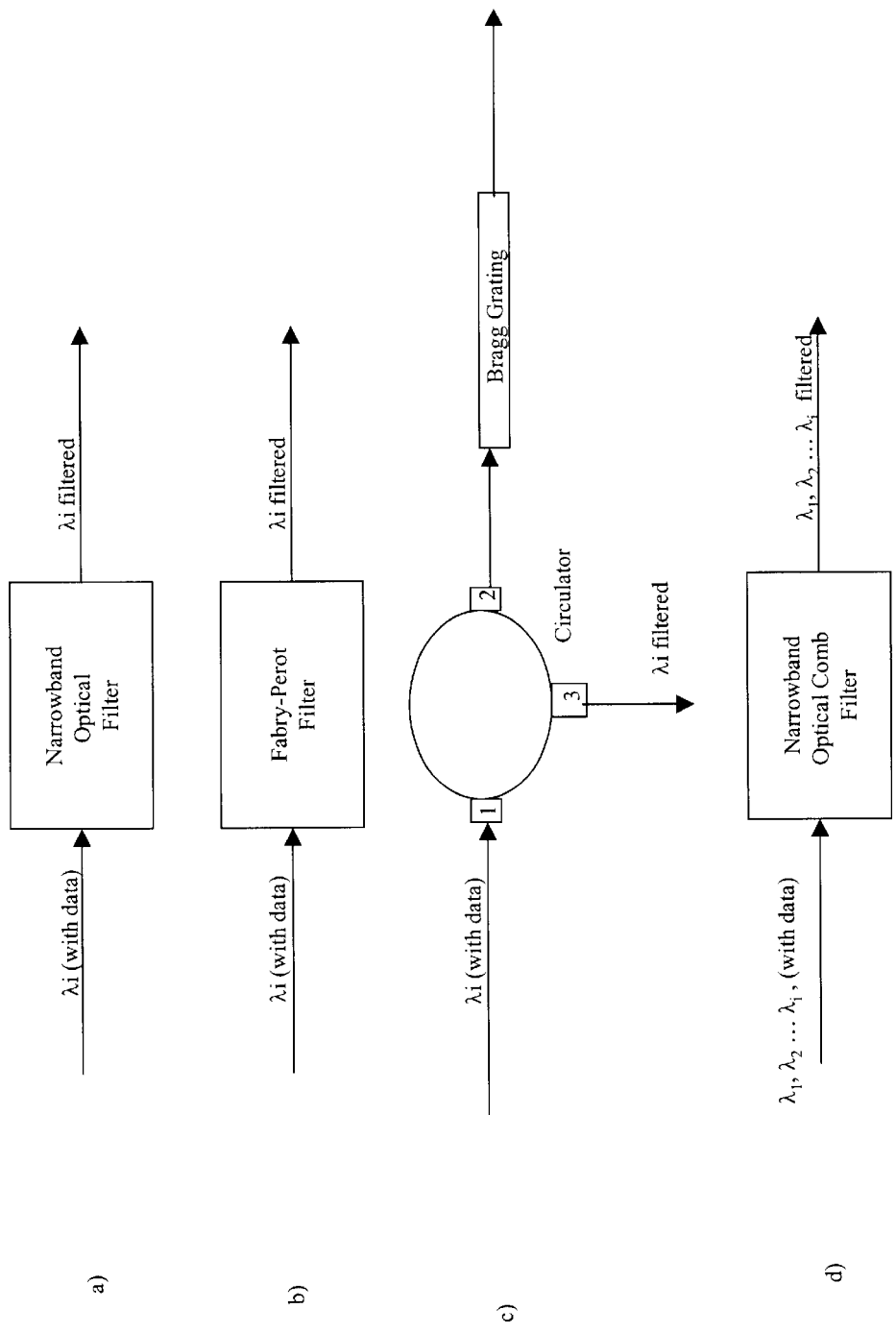
FIG. 5 is a block diagram showing smoothers which operate through narrow band filtering techniques, according to embodiments of the invention.

A smoother may be realized in various embodiments. Some embodiments of a smoother 404 ... 418, as in FIG. 4a, utilize a narrow band approach, i.e., filtering out all signals whose frequencies lie outside of a narrow band of frequencies. FIG. 5 shows schematically the operation of a narrow band filter (FIG. 5a), and three embodiments (FIG. 5b,c,d). In FIG. 5a, a narrow band optical filter, shown as a block diagram, removes substantially all wavelength components other than the optical carrier wavelength $\lambda_i$ thus removing substantially all modulated information from the carrier wavelength. FIG. 5b a block diagram of a first embodiment, which is a Fabry-Perot filter, employed to filter out substantially all but the optical carrier wavelength $\lambda_i$. A second embodiment depicted in FIG. 5c, utilizes a Bragg grating to reflect substantially only the optical carrier wavelength $\lambda_i$, coupling with a circulator that directs the optical carrier wavelength to an output. A third embodiment shown in FIG. 5d comprises a narrow band optical comb filter that filters out all but a plurality of substantially single wavelength optical carriers of distinct wavelength $\lambda_i$, the output of which is de-multiplexed onto a plurality of waveguides, with one optical carrier of wavelength $\lambda_i$, output onto each of the plurality of waveguides. This smoother of FIG. 5d may be employed in a Reduced Source Optical Add/Drop Node as shown in FIG. 4b, wherein only one tap 406, one smoother 404, and a de-multiplexing device 440 is needed, rather than multiple taps and multiple smoothers as in FIG. 4a.

Figure 6:
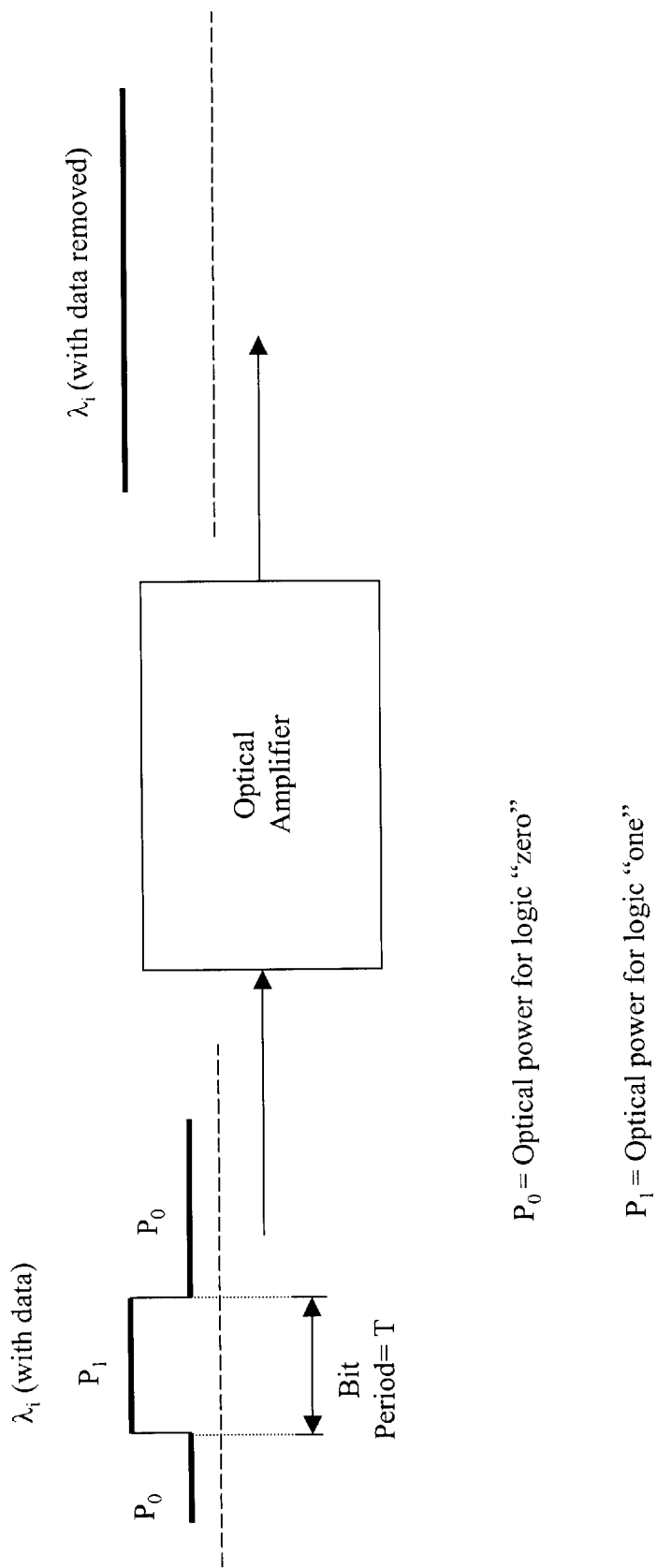
FIG. 6 is a block diagram showing a smoother that operates by saturated amplification, according to an embodiment of the invention.

Other embodiments of a smoother may be utilized to filter out the modulated information from a modulated optical signal, outputting a substantially single optical carrier wavelength as output. One such embodiment is shown in FIG. 6. An optical amplifier, operated in saturated mode, does not respond to a difference in input power between the logical "zero" state and the logical "one" state; rather, for a non-zero input (which includes both a logical "one" and a logical "zero") its output remains at a constant saturation output power. Another embodiment of a smoother is shown in FIG. 6, using a fast saturable amplifier, wherein the gain response time of the amplifier ramp is typically shorter than the data period T, i.e., $\tau_{amp}/T \ll 1$; the amplifier satisfying the additional condition $$P_1 \cdot G_0 \gg P_{sat}$$

where the saturable amplifier has unsaturated gain $G_0$, $P_0$ is the non-zero input power for a "0" data bit, and $P_1$ is the input power for a "1" data bit. One embodiment of a saturable amplifier uses a semiconductor optical amplifier (SOA), typically having sub-nanosecond gain response time.

It may be desirable to integrate the modulator (in FIG. 4a, modulator 420) with a saturable amplifier-smoother (in FIG. 4a, smooother 418) by modulating the net gain of the amplifier with, i.e., information that may be retrieved from a receiver (in FIG. 4a, receiver 416). In one embodiment of a saturable amplifier-smoother/modulator (not shown), the modulation is accomplished by switching the saturable amplifier-smoother between its "off" state (no output) for a "0" bit modulation, and its "on" state (saturated power output) for a "1" bit modulation.

Figure 7:
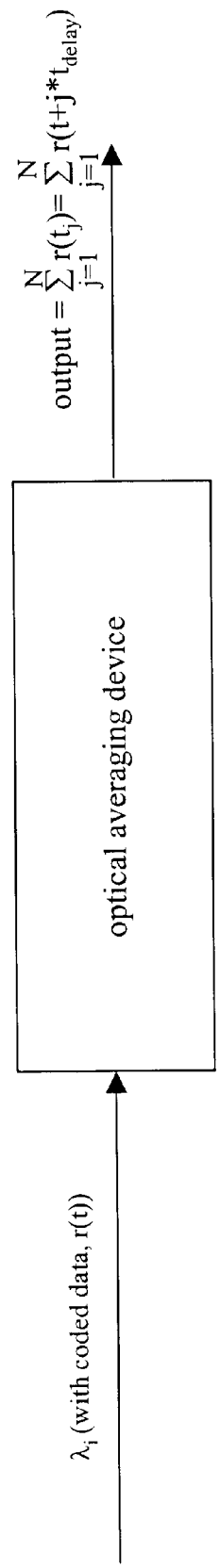
FIG. 7 is a block diagram showing a smoother that operates by time averaging of coded signals, according to an embodiment of the invention.

Another smoother embodiment is shown schematically in FIG. 7, which uses an optical averaging device 702. The optical averaging device 702 accepts a modulated wavelength $\lambda_i$ encoded with data r(t), averages the input amplitude over a time period which is long compared with the coding period (the coding period is essentially defined as the length of time over which the number of encoded "1" s is substantially equal to the number of encoded "0" s) and produces an averaged output which has substantially constant amplitude, at the carrier wavelength $\lambda_i$. One such time averaging device is a Fabry-Perot filter with a large cavity such that the transient time $t_{delay}$ is comparable to the bit period (See FIG. 6) of the signal. Other devices known in the art that filter out modulated information from a modulated optical signal to produce an un-modulated carrier wavelength, may likewise be employed as a smoother.

Figure 8A:
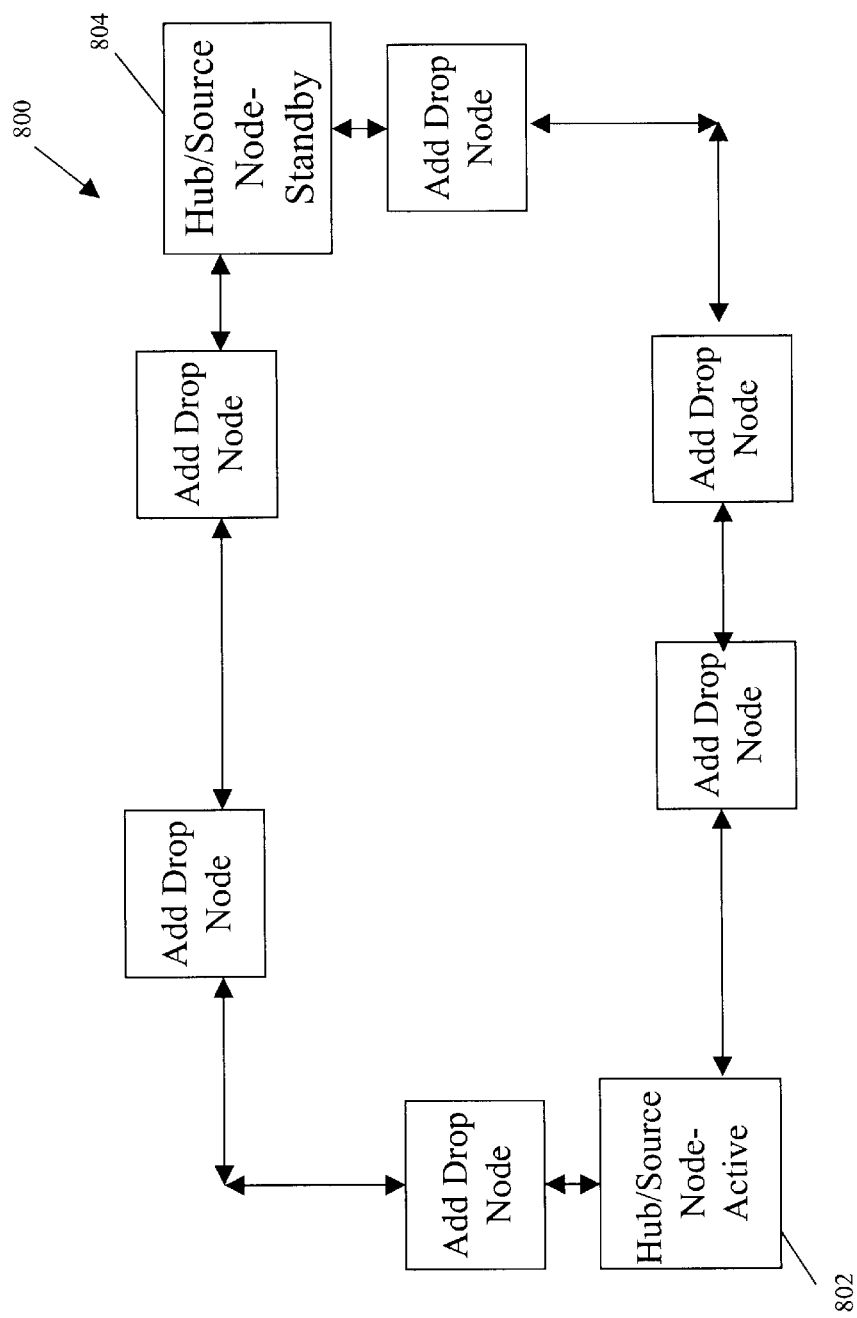
FIG. 8a is a block diagram of a ring optical add/drop network implementing one or more add/drop nodes according to an embodiment of the invention, and a plurality of redundant hub/source nodes, according to an embodiment of the invention.

Referring back to the ring Optical Add/Drop Multiplexed (OADM) network 100 comprising a plurality of add/drop nodes 102, the use of Reduced Source Optical Add/Drop Nodes results in a reduced number of optical sources needed for the ring OADM network (compared with the use of a prior art add/drop node as in FIG. 3), since the Reduced Source Optical Add/Drop Nodes typically will not have their own internal sources. As a result, the plurality of optical sources for the ring may be centralized to a source node. One embodiment of a configuration with centralized optical sources is depicted in FIG. 8a. Here a hub/source node 802 is a repository for the optical sources, typically comprising lasers, for the ring, providing unmodulated optical carrier wavelengths output onto the OADM ring network. Modulated wavelengths are provided to the OADM ring network by the hub/source node 802, which may generate modulated wavelengths internally through internal modulators modulating one or more carrier wavelengths generated from internal sources; alternatively, the hub node 806 may receive one or more modulated carrier wavelengths from external sources such as a Wide Area Network (WAN), and multiplex them onto the ring. A redundant standby hub/source node 804 which is essentially identical to hub/source node 802, ensures that, in the event of a source node failure, by switching to the standby source node service may remain uninterrupted. Activating the standby hub/source node 804 allows for repair of the hub/source node 802 while the ring OADM network 800 remains in service. Thus, through use of Reduced Source Optical Add/Drop Nodes, centralized source redundancy can be realized.

Figure 14:
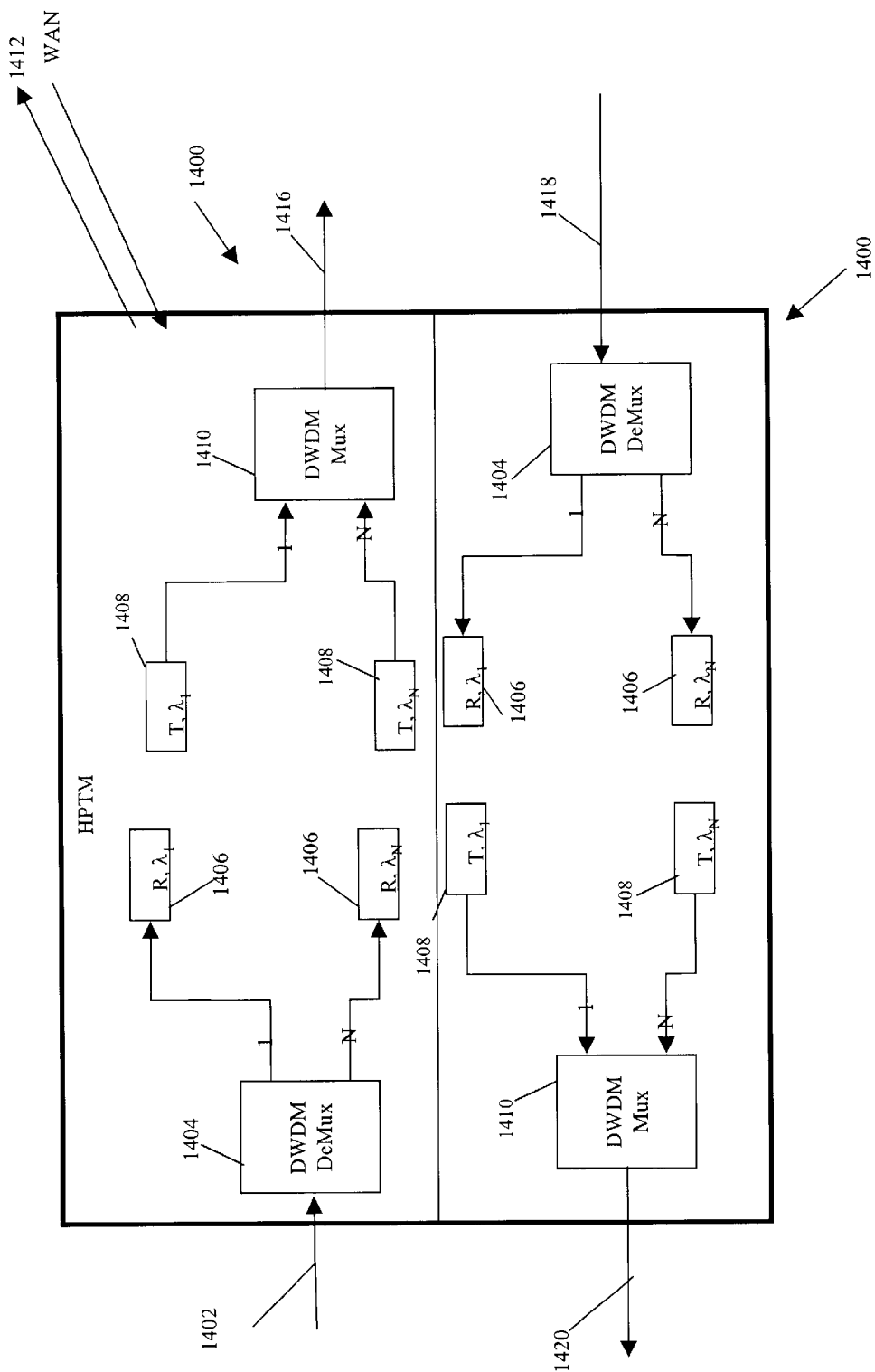
FIG. 14 (prior art) is a block diagram of an HPTM that may be used as a hub node in a ring OADM network such as shown in FIG. 1, according to an embodiment of the invention.

FIG. 14 (prior art) shows a typical hub/source node. Traffic flows within the ring in two directions: traffic is input in one direction through input 1402 and output through output 1416; in the opposite direction, traffic is input through input 1418 and output through output 1420. Modulated wavelengths are de-multiplexed at DWDM de-multiplexers 1404, and individual wavelengths subsequently input to receivers 1406, where information is decoded. Carrier wavelengths $\lambda_i$ are generated and modulated with information at transmission stations 1408, and subsequently multiplexed at DWDM multiplexers 1410. Modulated wavelengths may also be input and output to a Wide Area Network (WAN) 1412.

Figure 15:
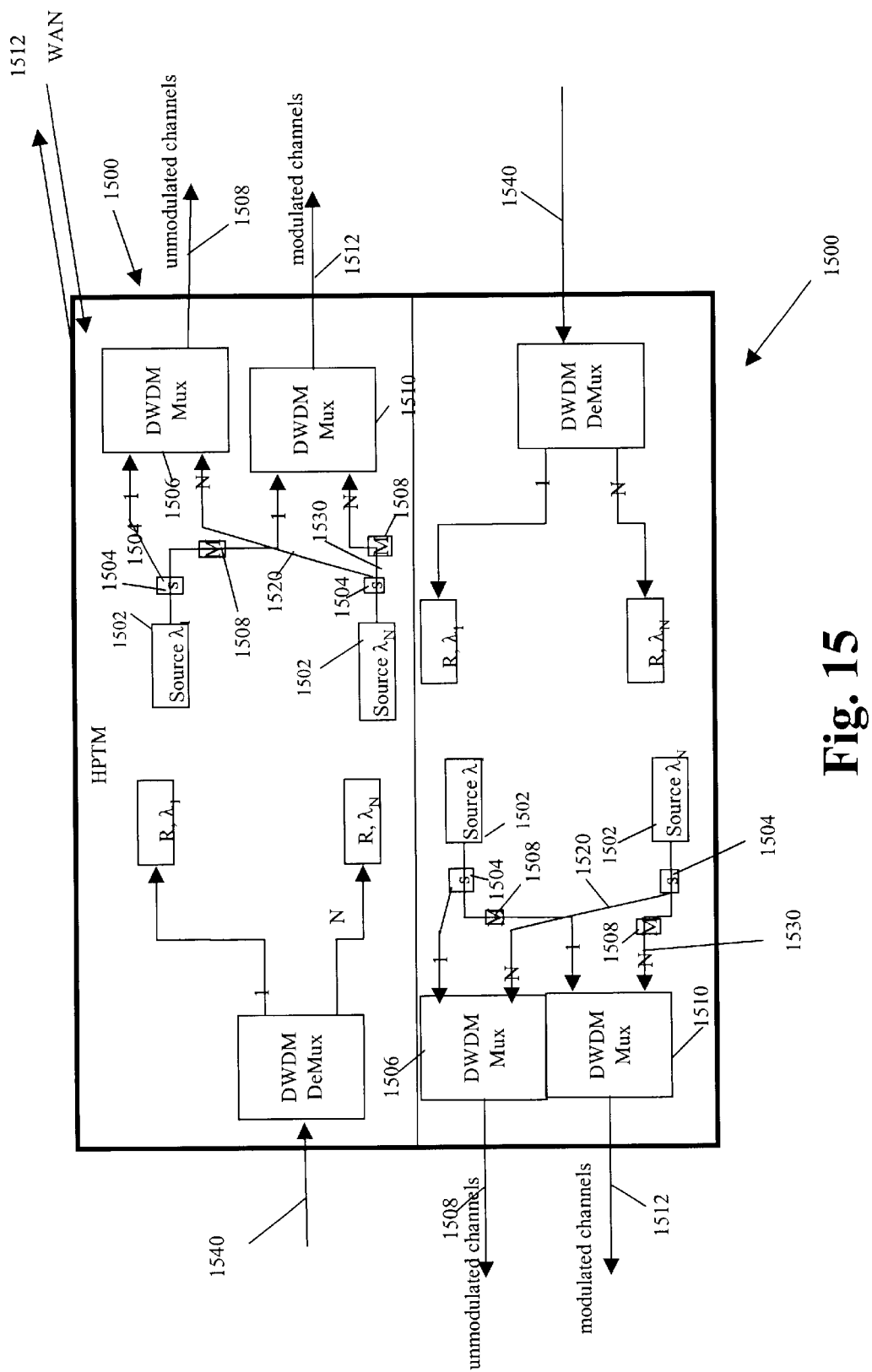
FIG. 15 is a block diagram is a block diagram of an HPTM that may be used as a hub/source in a ring OADM network such as shown in FIG. 8a and FIG. 8b, according to an embodiment of the invention.

FIG. 15 shows a hub/source node according to an embodiment of the invention, which outputs unmodulated carrier wavelengths and modulated carrier wavelengths. Outputs from respective wavelength sources 1502 are split into two respective paths by splitters 1504. A first of the respective paths 1520 is input, unmodulated, to a DWDM multiplexer 1506; all unmodulated wavelengths input into DWDM multiplexer 1506 are multiplexed, and output as a multi-wavelength unmodulated channel 1508, feeding into the wavelength bus (not shown). A second of the respective paths 1530 for each unmodulated wavelength is modulated at a modulator 1508, and subsequently multiplexed at a DWDM multiplexer 1510, and output as multiplexed modulated channels 1512 which are output onto the OADM ring. Inputs are received at input ports 1540, in similar fashion to that of FIG. 14.

Figure 4C:
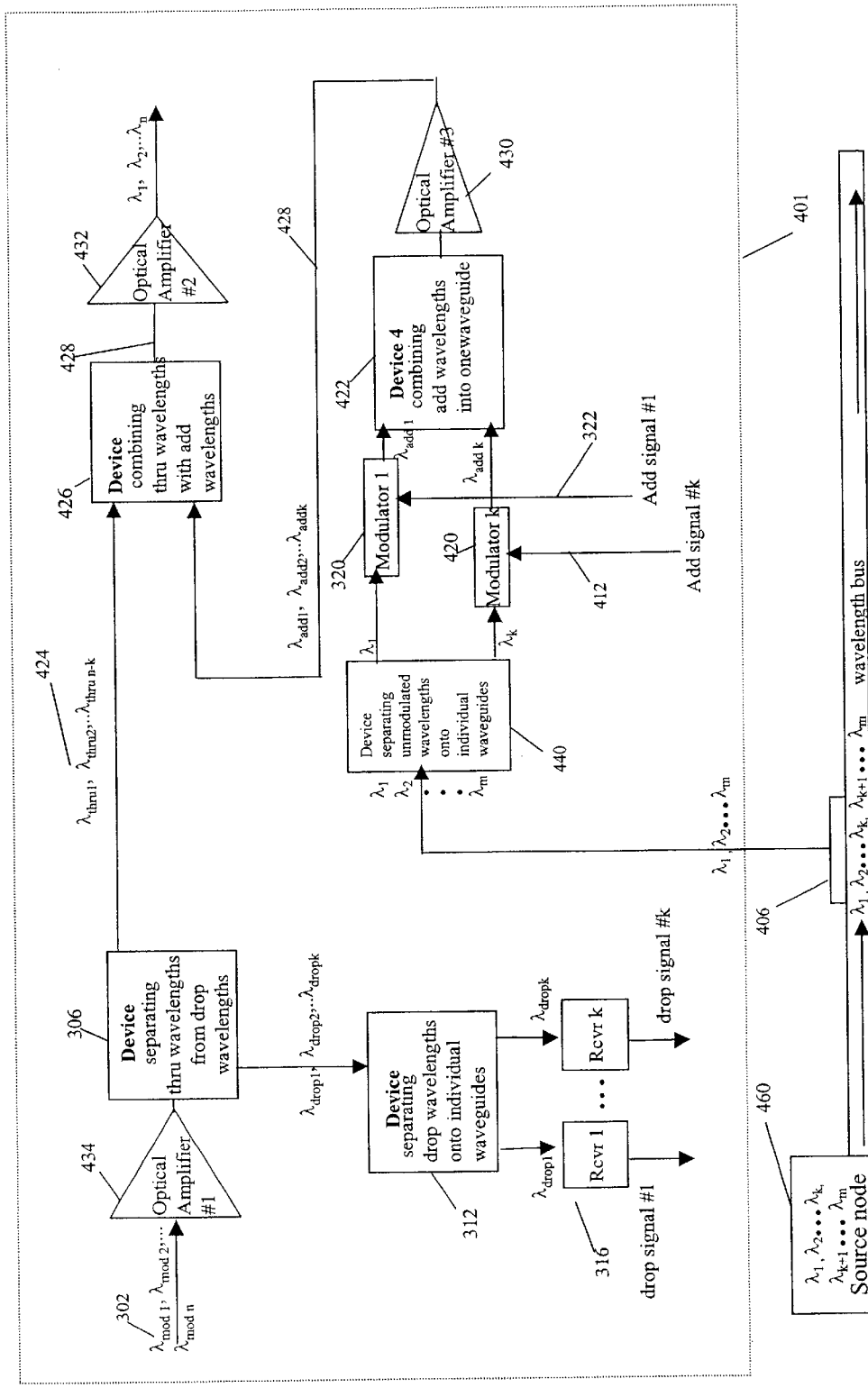
FIG. 4c is a block diagram of an add/drop node with shared optical sources, according to an embodiment of the invention.

Another embodiment 401 of a Reduced Source Optical Add/Drop Node is shown in FIG. 4c. In this embodiment, substantially unmodulated optical carriers $\lambda_1, \ldots \lambda_m$ are provided to the Optical Add/Drop Node 401 by a wavelength trunk line 450, through a tap 406. A de-multiplexing device 440, which separates the substantially unmodulated optical carriers $\lambda_1, \ldots \lambda_m$, outputs a subset comprising substantially unmodulated optical carriers $\lambda_1, \ldots \lambda_k$, one substantially unmodulated optical carrier for each of the k respective modulators 320, ... 420. The substantially unmodulated optical carriers $\lambda_1, \ldots \lambda_k$ may be provided to the wavelength trunk line 450 by a centralized source node 460 comprising optical sources for the optical carriers $\lambda_1, \ldots \lambda_k, \lambda_{k+1}, \ldots \lambda_m$. Alternatively, the outputs of individual optical sources for the optical carriers $\lambda_1, \ldots \lambda_k$ may be multiplexed onto the wavelength trunk line 450.

Figure 8B:
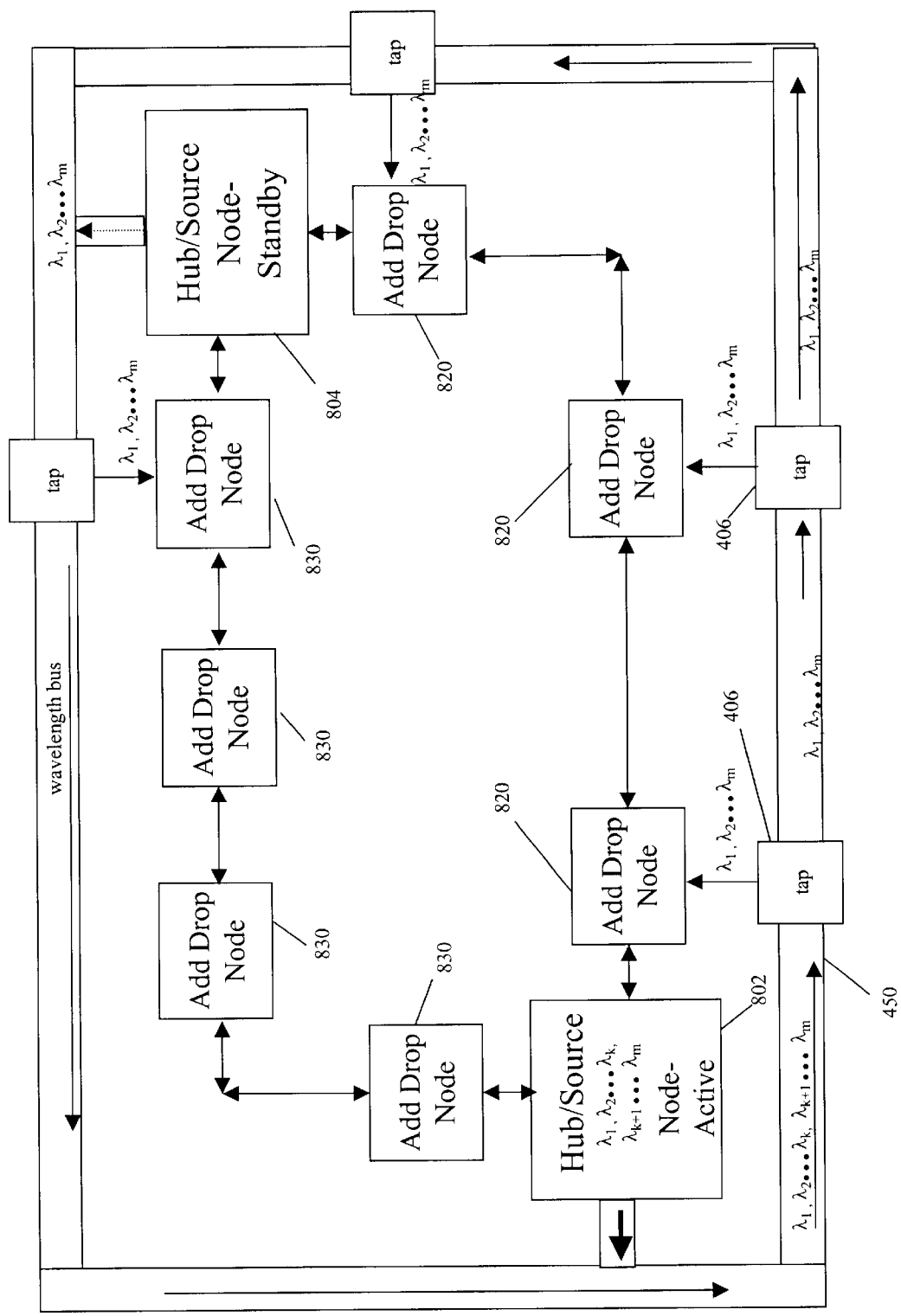
FIG. 8b is a block diagram of a ring optical add/drop network implementing one or more add/drop nodes according to an embodiment of the invention, a plurality of redundant hub/source nodes, and a wavelength bus, according to an embodiment of the invention.
Figure 9:
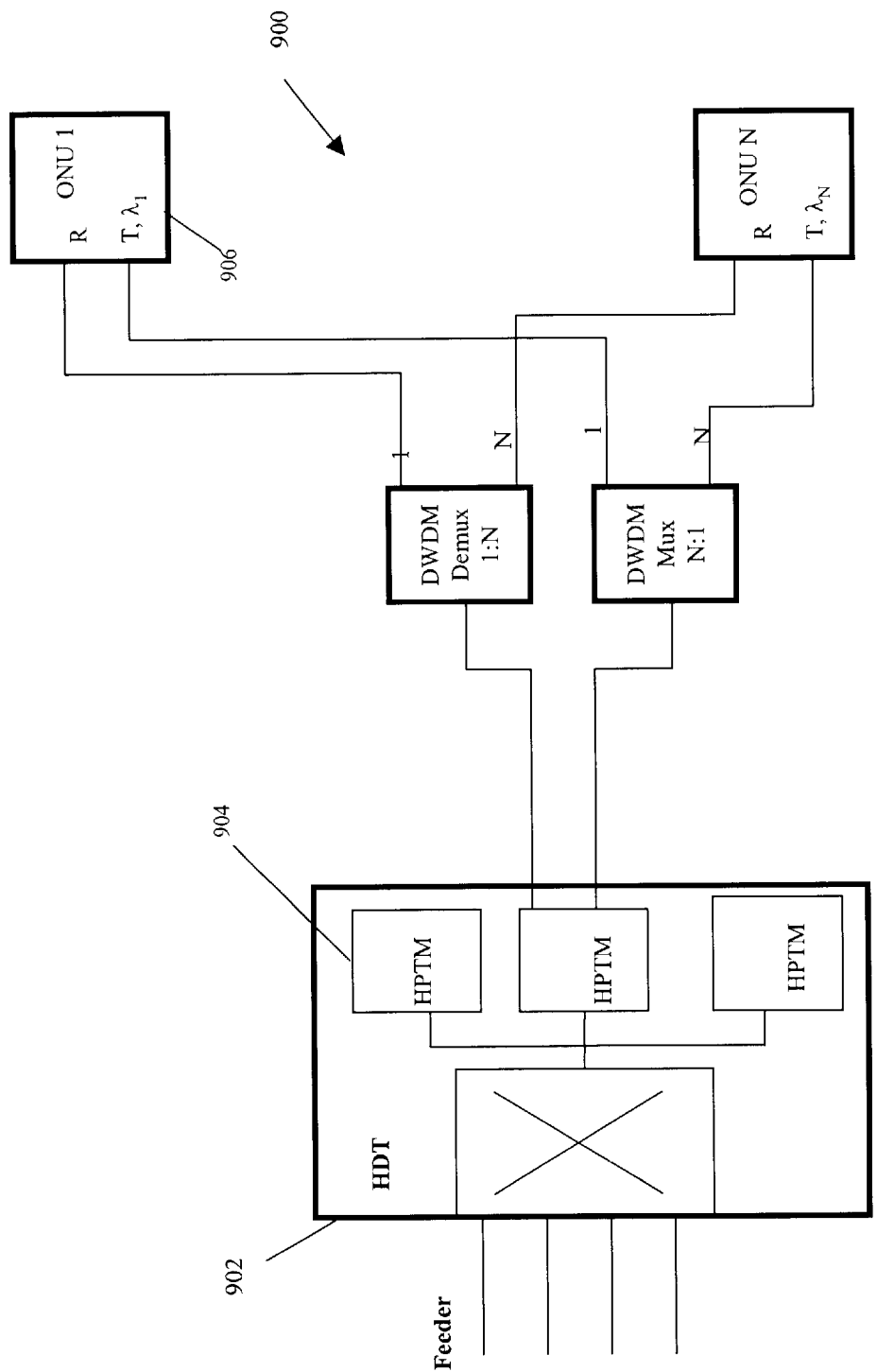
FIG. 9 (prior art) is a block diagram of a dense wavelength division-multiplexed (DWDM) Passive Optical Network (PON).

Another embodiment of an OADM ring network with centralized source node(s), is shown in FIG. 8b, utilizing one or more Reduced Source Optical Add/Drop Nodes illustrated by the embodiment of FIG. 4c. A-centralized hub/source node 802 provides optical carriers $\lambda_1, \ldots \lambda_k, \lambda_{k+1}, \ldots \lambda_m$ a wavelength bus 450. Reduced Source Optical Add/Drop Nodes 820 are of the type depicted in FIG. 4c. Optical carriers are provided from the wavelength bus 450 to each of the Reduced Source Optical Add/Drop Nodes 820 by tap 406; a Reduced Source Optical Add/Drop Node 820 may, after de-multiplexing, re-modulate each of a subset of the optical carriers, e.g., $\lambda_1, \ldots \lambda_k$. Conventional add/drop nodes 830 typically comprise internal optical sources for re-modulation; alternatively, all add/drop nodes may be Reduced Source Optical Add/Drop Nodes. The hub/source node 802 provides modulated wavelengths for the ring; the modulated wavelengths may be fed into the hub/source node 802 from external sources, or generated internally to the hub/source node 802 which may comprise modulators that modulate optical carriers, the optical carriers typically being generated internally. An embodiment of a hub/source node that generates substantially unmodulated carrier wavelengths which are output to the wavelength bus 450, is shown in FIG. 15.

Figure 10:
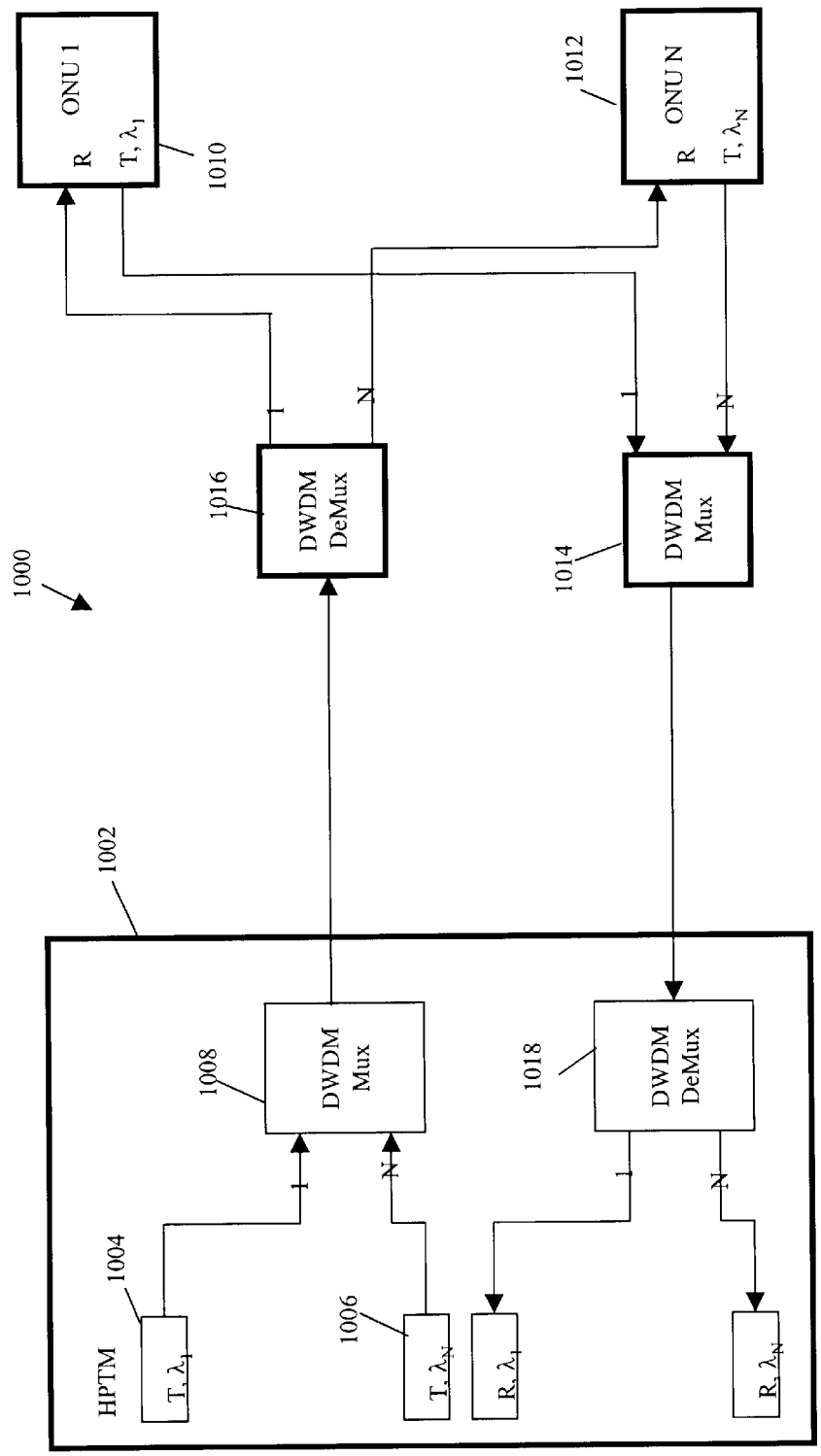
FIG. 10 (prior art) is a block diagram of a portion of a dense wavelength division-multiplexed (DWDM) Passive Optical Network (PON).

FIG. 10 (prior art) depicts a portion 1000 of a Passive Optical Network (PON), the portion comprising a single Host Digital Terminal Passive Optical Network Terminal Module (HPTM, also referred to as an HPTM station herein) 1002, a Dense Wavelength Division Multiplexing (DWDM) de-multiplexer 1016, a DWDM multiplexer 1014, two Optical Network Units (ONUs, or ONU stations herein) 1010 and 1012, and interconnecting waveguides. Modulated optical signals typically travel "downstream" from HPTM to one or more ONUs; also "upstream," from an ONU to one or more HPTMs. FIG. 10 shows schematically the makeup of a typical HPTM 1002. Modulated optical signals output from transmitters 1004, . . . , 1006, are input into a DWDM multiplexer 1008. Each of the modulated optical signals typically has its own optical source, supplying a carrier wavelength $\lambda_i$, a total of N sources for the HPTM.

For a signal travelling "upstream, " i.e., from an ONU 1010 to an HPTM 1002, an optical source, typically located within the ONU, produces a substantially single wavelength carrier $\lambda_i$ which is modulated within the transmitting portion of the ONU, resulting in a modulated optical signal. The N ONUs all together typically produce a total of N modulated optical signals, which are subsequently multiplexed and transmitted to one or more HPTMs, where they are de-multiplexed and distributed to respective receivers, typically comprising one receiver for each modulated optical signal.

Figure 11:
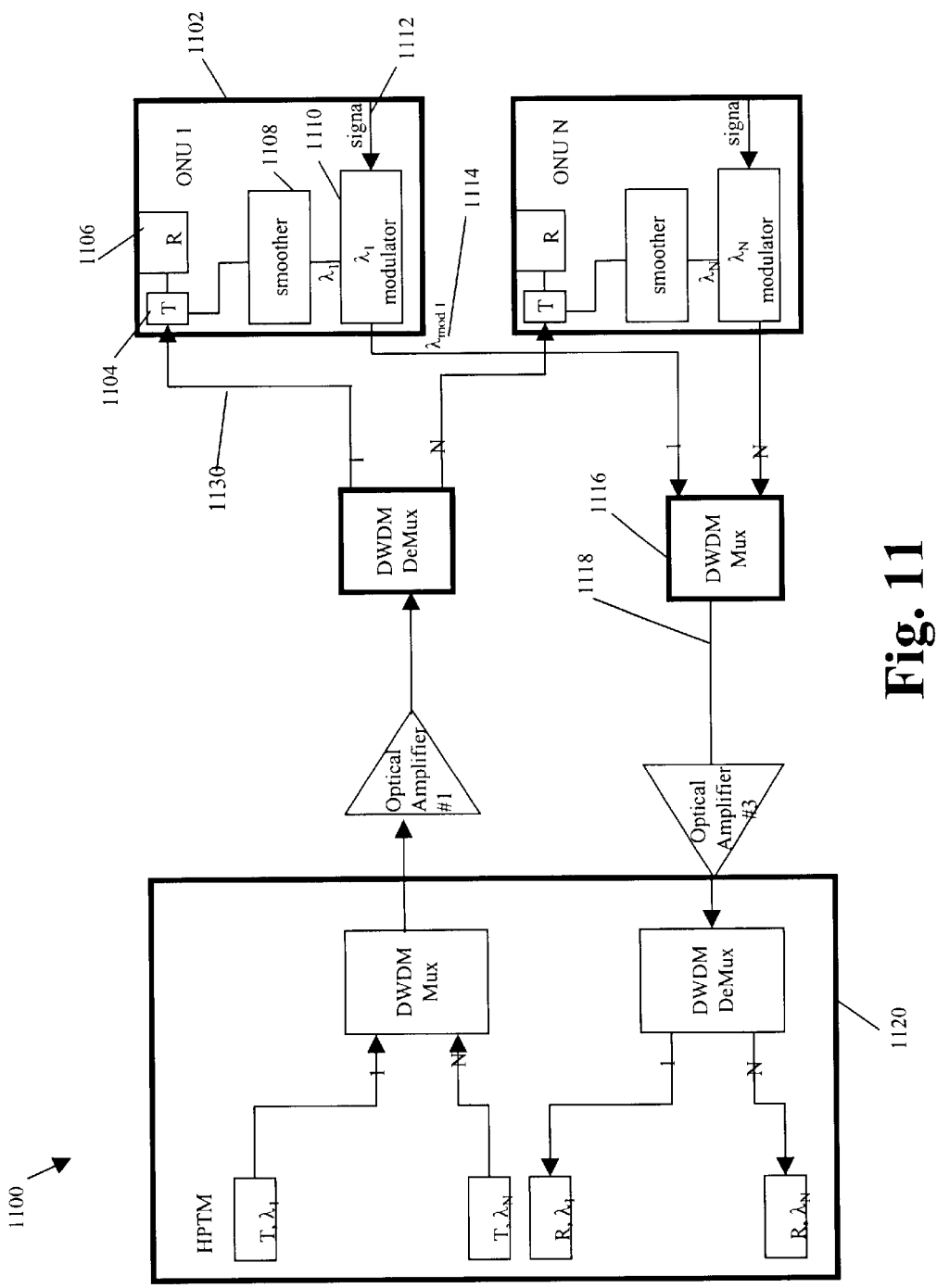
FIG. 11 is a block diagram of a portion of a dense wavelength division-multiplexed (DWDM) Passive Optical Network (PON) according to an embodiment of the invention.

An embodiment of the invention is depicted schematically in FIG. 11. Within an ONU 1102, a tap 1104 divides a received modulated optical signal 1130 into two portions. A first portion is directed to a receiver 1106, where it is demodulated. A second portion is directed to a smoother 1108, in which the modulated information is removed from the incoming signal, and a un-modulated optical carrier $\lambda_1$ is output, directed to a modulator 1110. In the modulator 1110 the un-modulated optical carrier $\lambda_1$ is modulated by an incoming signal 1112, and the resulting modulated optical signal 1114 is output to a DWDM multiplexer 1116. The modulated optical signals output from the plurality of ONUs are multiplexed by a DWDM multiplexer 1114, and subsequently output onto an optical waveguide 1118, typically optical fiber, whereupon they are transmitted to the HPTM 1120. In this embodiment, no optical source is needed at each ONU in order to produce a modulated optical signal to be sent to an HPTM. Thus, the total number of optical sources needed for operation of the PON is reduced from that of the prior art; in this embodiment, the total number is reduced by N from that of the prior art depicted in FIG. 10.

Figure 12:
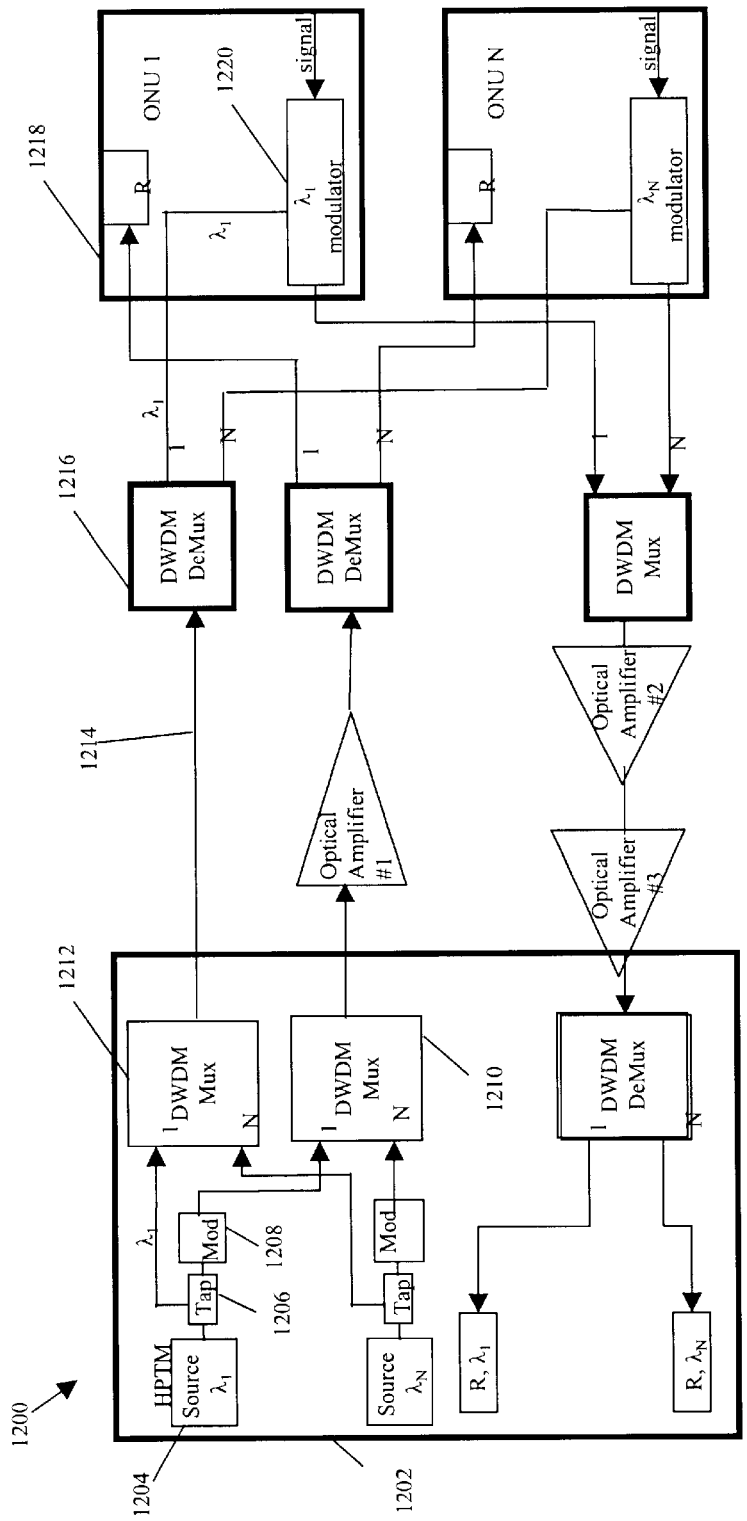
FIG. 12 is a block diagram of a portion of a dense wavelength division-multiplexed (DWDM) Passive Optical Network (PON) according to an embodiment of the invention.

Another embodiment 1200 of the invention is shown in FIG. 12. Within an HPTM 1202, an optical source 1204 produces an optical carrier of substantially single wavelength $\lambda_1$, which is directed to a tap 1206. The tap 1206 divides the optical carrier into two portions. A first portion is directed to a modulator 1208, where the optical carrier is modulated with information. The output of the modulator 1208 is directed to a first DWDM multiplexer 1210. A second portion of the optical carrier is directed to a second DWDM multiplexer 1212. In similar fashion a plurality of optical sources produces a respective plurality of optical carriers $\lambda_i$, each of which is divided by a respective tap. A respective first portion of each of the optical carriers $\lambda_i$ is modulated with respective information in a respective modulator; subsequently the respective modulated optical signals are directed to the DWDM multiplexer 1210. A respective second portion of each of the optical carriers $\lambda_i$ is directed to the DWDM multiplexer 1212. The plurality of optical carriers $\lambda_i$ input to the DWDM multiplexer 1212 are multiplexed, output onto an optical waveguide 1214, and de-multiplexed at the receiving station by a de-multiplexer 1216, into a plurality of N carrier wavelengths $\lambda_i$. Each of the respective carrier wavelengths $\lambda_i$ is directed to an ONU, e.g., an ONU 1218, where it serves as a carrier wavelength to be modulated by a modulator 1220. In this embodiment, no optical source is needed in an ONU, as the optical carrier is provided via transmission from the HPTM. Thus, the total number of optical sources needed for the PON is reduced; in this embodiment, the total number is reduced by N from that of the prior art depicted in FIG. 10.

Figure 13:
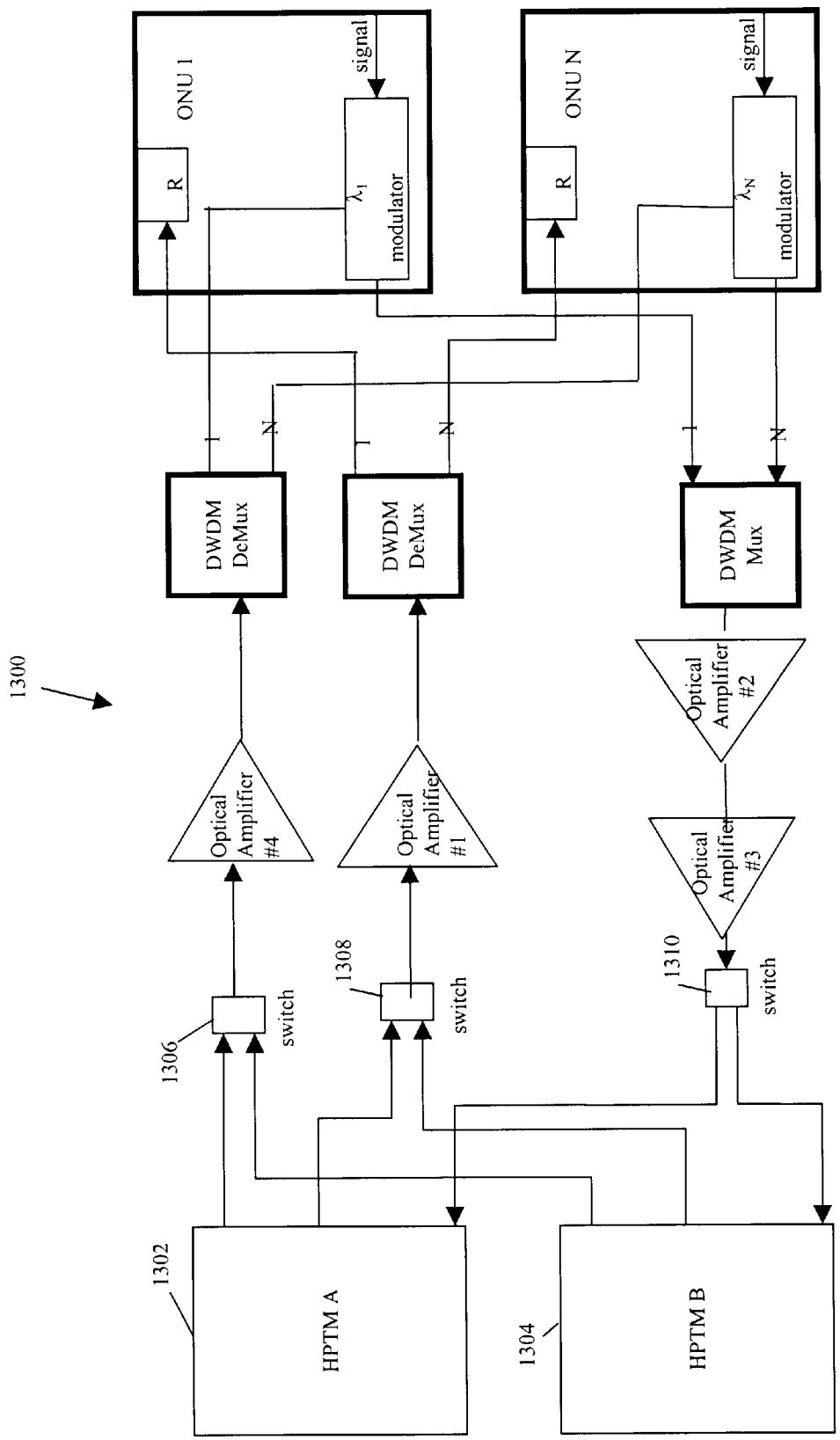
FIG. 13 is a block diagram of a Passive Optical Network with redundant Host Digital Terminal Passive Optical Network Terminal Modules (HDTMs), according to an embodiment of the invention.

In the embodiment shown in FIG. 12, all optical sources are contained within the HPTM. This localization of optical sources can be further utilized to create a source-redundant configuration for a PON. FIG. 13 depicts such a configuration of a PON 1300. An HPTM A 1302 and an HPTM B 1304 each comprise a substantially identical set of components, including all respective optical sources; hence HPTM 1302 and 1304 comprise a pair of redundant HPTMs. A switch comprising three switches 1306, 1308, 1310, operate so that either the HPTM A 1302 is operative to send and receive signals within the PON 1300, or HPTM B 1304 is operative to send and receive signals within the PON 1300. In the event of a failure within the HPTM that is active, the active HPTM may be inactivated and the standby HPTM made operative to send and receive signals within the PON 1300, by switching all of the three switches 1306, 1308, 1310. Thus there is redundancy in the PON, allowing for repairs to be conducted without shutting down the PON operation.

Having illustrated and described the principles of the invention in the above-described embodiments, it should be apparent to those skilled in the art that the embodiments can be modified in arrangement and detail without departing from such principles. In view of the many possible embodiments to which the presented may be applied, it should be recognized that the illustrated embodiments are only examples of the invention and should not be taken as a limitation on the scope of the invention. Rather, the invention is defined by the following claims. It is therefore claimed as the invention all such embodiments that come within the scope and spirit of these claims.

What is claimed is:

1. An apparatus comprising:

a tap to receive a modulated optical signal comprising a carrier wavelength and modulated information, the tap further to divide the modulated optical signal into a first branch modulated optical signal and a second branch modulated optical signal; and a smoother, to receive the first branch modulated optical signal, to remove the modulated information from the first branch modulated optical signal to produce a substantially unmodulated optical signal comprising the carrier wavelength, and to output the substantially unmodulated optical signal.

2. The apparatus of claim 1, further comprising:

a modulator, to receive the substantially unmodulated optical signal output from the smoother, further to modulate the substantially unmodulated optical signal with re-modulating information, to produce a re-modulated optical signal comprising the carrier wavelength.

3. The apparatus of claim 2, wherein the first re-modulating information is identical to the first modulated information.

4. The apparatus of claim 1, further comprising:

a second tap that inputs a second modulated optical signal comprising a second carrier wavelength and second modulated information, the second tap operative to divide the second modulated optical signal into a third branch modulated optical signal and a fourth branch modulated optical signal; and a second smoother operative to receive the fourth branch modulated optical signal, the second smoother operative to remove the second modulated information from the fourth branch modulated optical signal to produce a second substantially unmodulated optical signal comprising the second carrier wavelength, the second smoother further operative to output the second substantially unmodulated optical signal.

5. The apparatus of claim 4, the second smoother comprising at least one of a narrow band optical filter, a narrow band optical comb filter, a saturable optical amplifier, and an optical averaging device.

6. The apparatus of claim 4, further comprising:

a second modulator, operative to receive the second substantially unmodulated optical signal output from the second smoother, further operative to modulate the second substantially unmodulated optical signal with a second re-modulating information, producing a second re-modulated optical signal comprising the second carrier wavelength.

7. The apparatus of claim 6, wherein the second re-modulating information is identical to the second modulated information.

8. The apparatus of claim 6, further comprising:

a signal combining device, to multiplex a plurality of re-modulated optical signals.

9. The apparatus of claim 8, wherein the apparatus comprises a DWDM passive optical network.

10. The apparatus of claim 1, the smoother comprising at least one of a narrow band optical filter, a narrow band optical comb filter, a saturable optical amplifier, and an optical averaging device.

11. The apparatus of claim 10, wherein the saturable optical amplifier is a saturable amplifier-smoother/modulator, operative to re-modulate a substantially unmodulated optical signal.

12. A method comprising:

dividing a first modulated optical signal comprising a first carrier wavelength and first modulated information, into a first branch modulated optical signal and a second branch modulated optical signal, each branch of which comprises the first carrier wavelength and first modulated information;

removing the first modulated information from the second branch modulated optical signal to produce a first substantially unmodulated optical signal comprising the first carrier wavelength; and outputting the first substantially unmodulated optical signal.

13. The method of claim 12, further comprising:

receiving the first substantially unmodulated optical signal;

modulating the first substantially unmodulated optical signal with first re-modulating information, producing a first re-modulated optical signal.

14. The method of claim 13 wherein the first re-modulating information is identical to the first modulated information.

15. The method of claim 13, further comprising:

dividing a second modulated optical signal comprising a second carrier wavelength and second modulated information, into a third branch modulated optical signal and a fourth branch modulated optical signal, each of which comprises the second carrier wavelength and second modulated information;

removing the second modulated information from the fourth branch modulated optical signal to produce a second substantially unmodulated optical signal comprising the carrier wavelength; and outputting the second substantially unmodulated optical signal.

16. The method of claim 15, further comprising:

receiving the second substantially unmodulated optical signal; and modulating the second substantially unmodulated optical signal with a second re-modulating information, producing a second re-modulated optical signal comprising the second carrier wavelength.

17. The method of claim 16 wherein the second re-modulating information is identical to the second modulated information.

18. The method of claim 16 further comprising:

multiplexing a plurality of re-modulated optical signals; and outputting the multiplexed plurality of re-modulated optical signals.

19. An apparatus comprising:

a means for dividing a modulated optical signal comprising a carrier wavelength and modulated information, into a first branch modulated optical signal and a second branch modulated optical signal;

a means for removing the modulated information from the second branch modulated optical signal to produce a substantially unmodulated optical signal comprising the carrier wavelength; and a means for outputting the substantially unmodulated optical signal.

20. The apparatus of claim 19, further comprising:

a means for re-modulating the substantially unmodulated optical signal.

* * * * *